Feb. 19, 1963
J. B. SMITH
3,078,108
SPLIT COUPLING
Filed Aug. 5, 1959
3 Sheets-Sheet 1
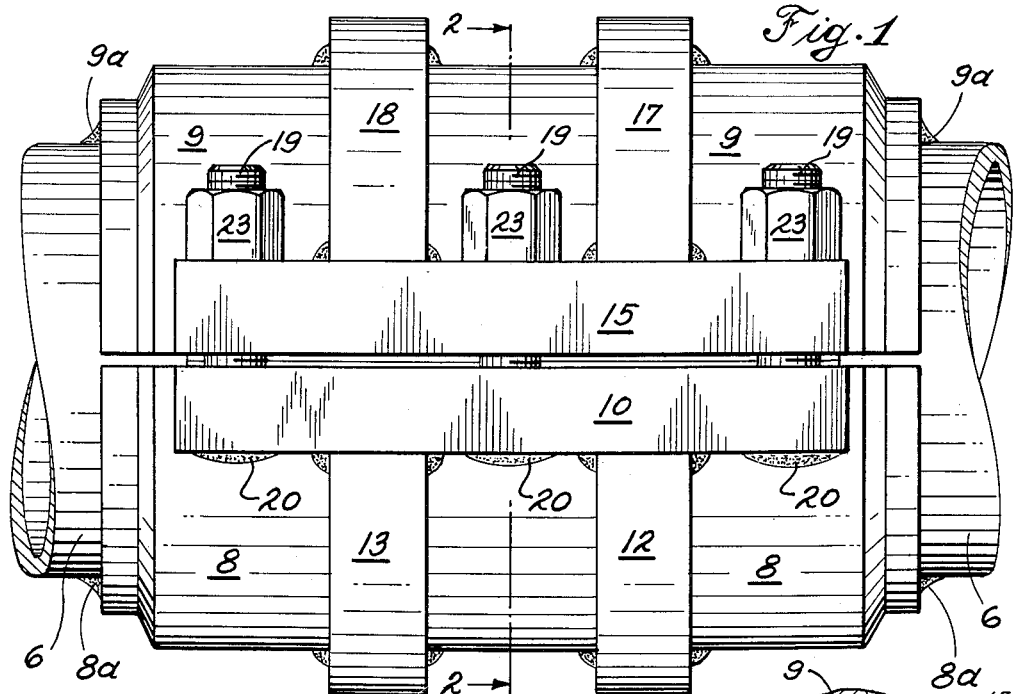
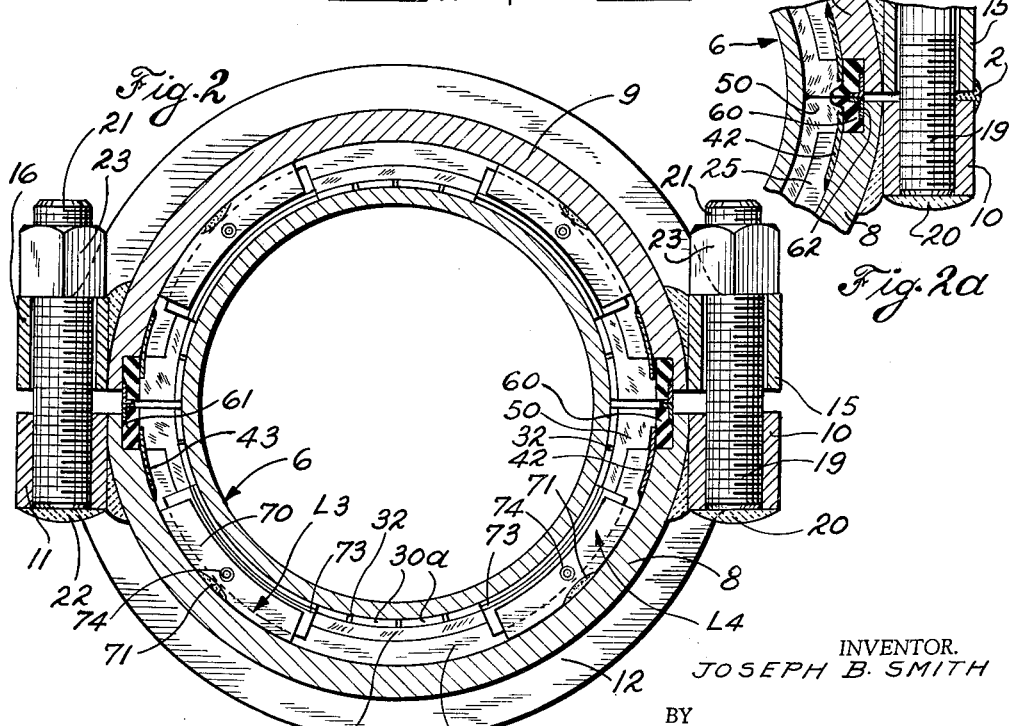
INVENTOR.
JOSEPH B. SMITH
BY
RICHEY, McNENNY & FARRINGTON
Donald W. Farrington
ATTORNEYS Feb. 19, 1963    J. B. SMITH    3,078,108
SPLIT COUPLING
Filed Aug. 5, 1959    3 Sheets-Sheet 2
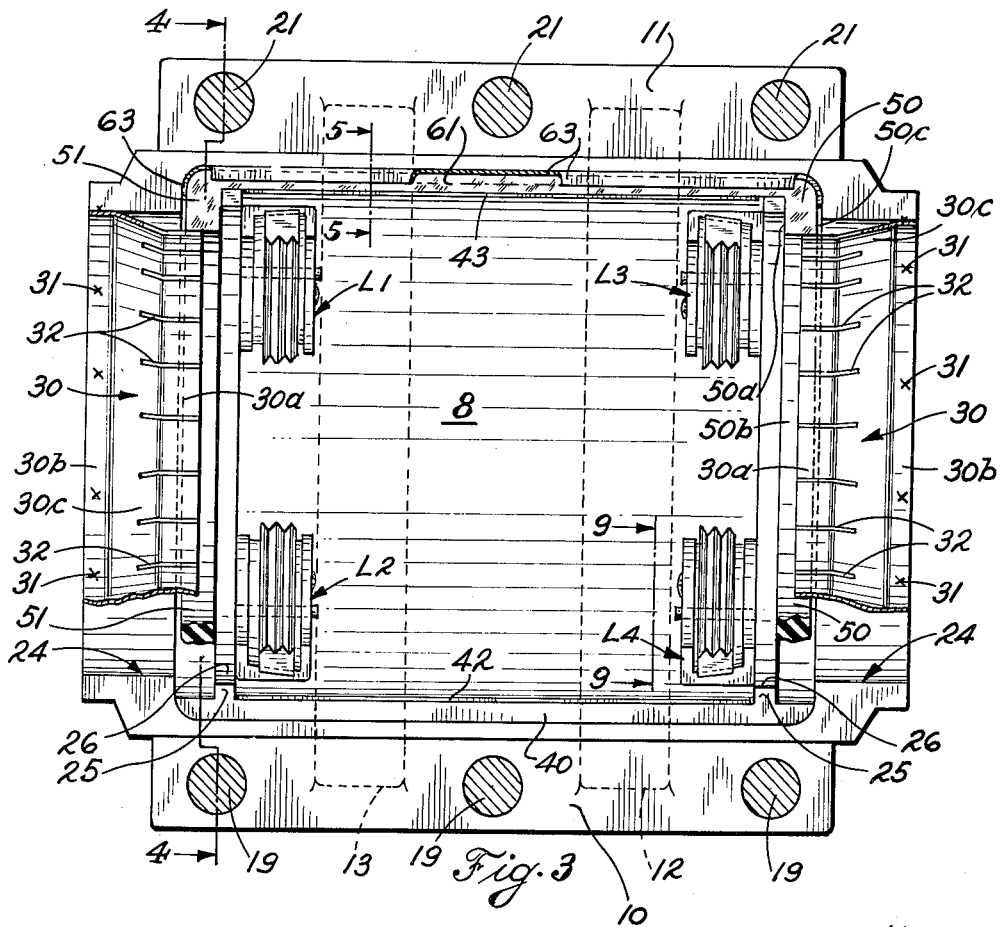
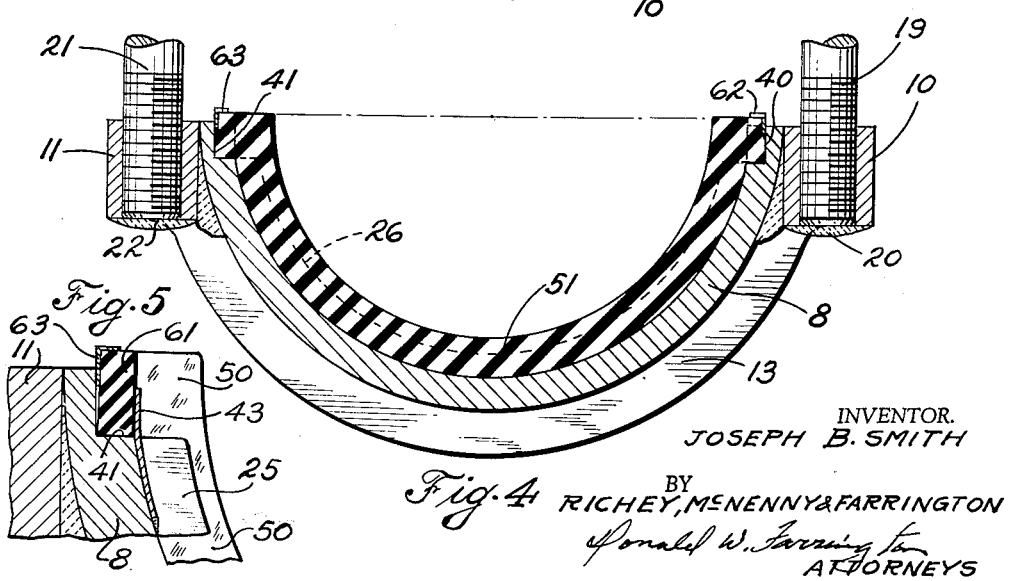
INVENTOR.
JOSEPH B. SMITH
BY RICHEY, McNENNY & FARRINGTON
ATTORNEYS

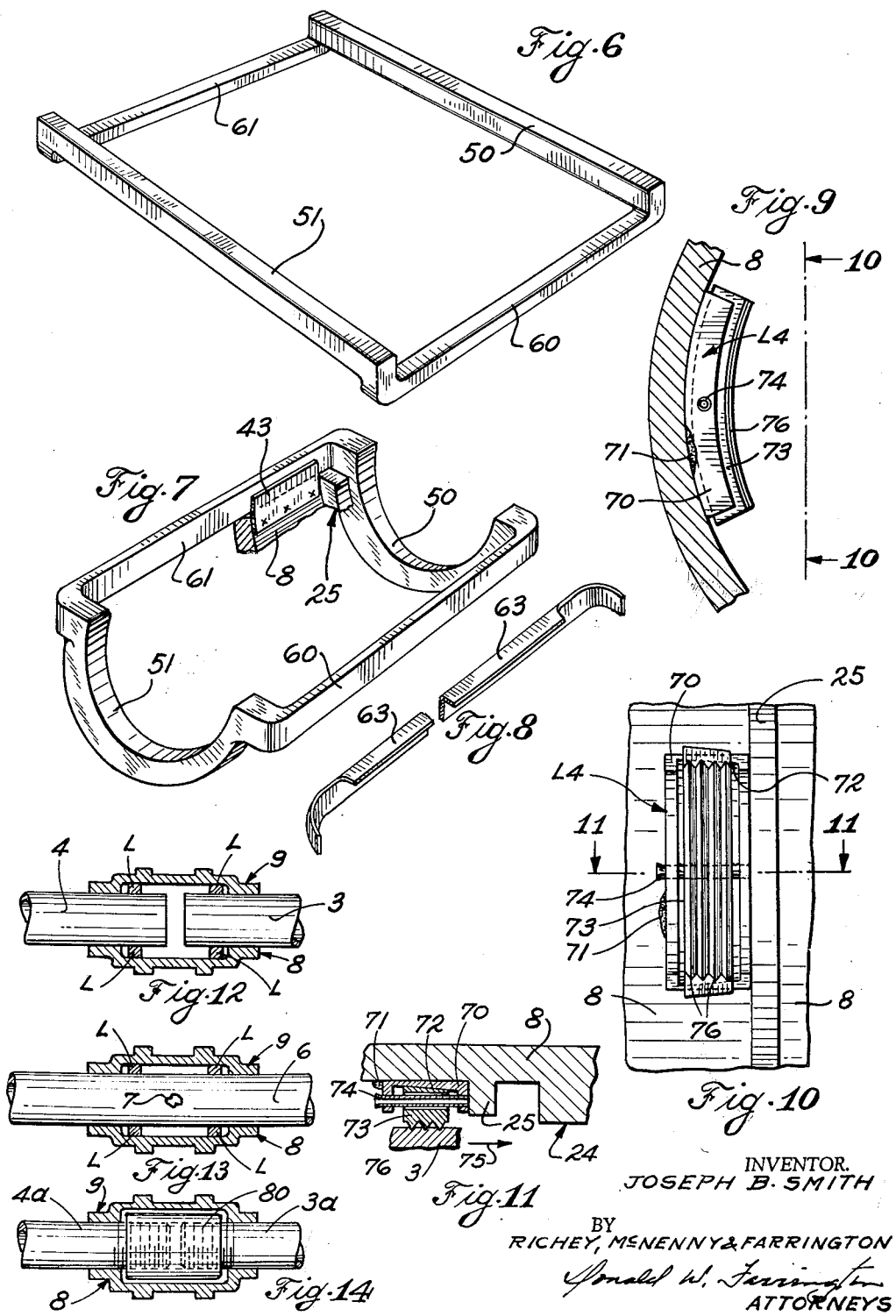

United States Patent Office
3,078,108
Patented Feb. 19, 1963

3,078,108
SPLIT COUPLING
Joseph B. Smith, Berea, Ohio
(5700 Detroit Ave., Cleveland 2, Ohio)
Filed Aug. 5, 1959, Ser. No. 831,780
3 Claims. (Cl. 285—104)

The present invention relates to pipe couplings and more particularly to a split coupling suited for repairing a break in a pipe line or in coupling two pieces of pipe.

The split coupling of the present invention comprises two similar complementary, semi-cylindrical coupling members arranged to embrace a pipe and to be clamped together and to be detachably or permanently secured to the pipe. The split coupling according to my invention is well suited for the connecting of two pieces of pipe or for covering a break or hole in a piece of pipe or embracing a conventional sleeve coupling securing two pieces of pipe together. In all three forms of use the split coupling according to my invention is suited for welding to the pipe and thus becoming a permanent part of the pipe installation.

It is among the objects of my invention to provide a split coupling of identical semi-cylindrical portions wherein each semi-cylindrical portion is constructed to provide a groove to receive a sealing gasket in opposite end portions of the coupling where the coupling embraces the pipe and said semi-cylindrical portion is constructed to provide a groove along each side of the coupling parallel to the central axis of the pipe and wherein said grooves are connected to each other and wherein a single unitary molded gasket is arranged in said grooves.

It is a further object of my invention to provide a split coupling according to the preceding object wherein each semi-cylindrical section of the coupling is provided with a semi-circular groove at each end thereof and a gasket of rubber-like material is arranged within said groove and is proportioned to project outwardly of the groove to embrace the pipe being coupled and wherein said semi-cylindrical gasket portion is connected by grooves at each side of the coupling parallel to the central axis of the pipe being coupled and a one-piece gasket within said connecting grooves is proportioned to project slightly beyond the grooves and wherein the body of the fitting is provided with metal girdering elements extending laterally over the gasket to prevent extrusion of the gasket on the drawing up of the coupling.

It is a further object of my invention to provide a coupling according to the preceding objects wherein the semi-cylindrical body sections of the coupling are each provided with a plurality of pipe-locking wedges and wherein said wedges are carried within the coupling by a wedge shoe detachably connected to the interior of the coupling to facilitate use of the coupling.

Further objects and advantages relating to efficiency in operation and economies in manufacture will appear from the following description and the appended drawings wherein:

FIG. 1 is an elevation of a coupling made according to my invention applied to a section of pipe;

FIG. 2 is a sectional view taken on the plane indicated at 2—2 of FIG. 1;

FIG. 2a is a showing with parts in section similar to FIG. 2 but illustrating the position of the parts with the nuts drawn up to clamp the sections together and the sections being welded as drawn up;

FIG. 3 is a plan view looking into one of the coupling sections with the pipe omitted;

FIG. 4 is a transverse sectional view taken on the plane indicated at 4—4 of FIG. 3;

FIG. 5 is a partial sectional showing taken as indicated at 5—5 of FIG. 3;

FIG. 6 is a perspective view of the rectangular gasket employed in the coupling made according to my invention;

FIG. 7 is a perspective view of the gasket showing the shape assumed by the gasket when assembled in the coupling;

FIG. 8 is a perspective view of a girdering element for straight side sections of the gasket shown in FIG. 7;

FIG. 9 is an elevation taken as indicated at 9—9 of FIG. 3 showing a pipe-locking wedge forming a part of the coupling of my invention;

FIG. 10 is an elevation of the pipe-locking wedge taken as indicated at 10—10 of FIG. 9;

FIG. 11 is a sectional view of the pipe-locking wedge taken as indicated at 11—11 of FIG. 10;

FIG. 12 is a diagrammatic showing of the coupling of my invention employed to couple the ends of adjacent pipe sections to each other;

FIG. 13 is a diagrammatic showing of the coupling according to my invention as applied to a pipe section having a break or hole therein; and FIG. 14 is a diagrammatic showing of the coupling according to my invention with the pipe-locking wedges removed to accommodate a sleeve coupling on a pair of adjacent pipes.

Referring to the drawings, the elevation of FIG. 1 corresponds to the diagrammatic arrangement of FIG. 13 wherein a single section of pipe 6 having a break or leak indicated at 7 is enclosed by the pipe coupling comprising the semi-cylindrical sections 8 and 9. The semi-cylindrical sections 8 and 9 are substantially identical and one of the sections, for example, lower section 8, will be described in detail. It will be understood that the same details of construction are found in the upper coupling section 9. In the assembly illustrated in FIG. 1 the section 8 is provided with a longitudinal rib along each edge as indicated at 10 and 11. Preferably the ribs 10 and 11 are welded to the semi-cylindrical section 8. The section 8 is also provided with arcuate ribs 12 and 13 which are welded to the semi-cylindrical section 8 and to the longitudinal ribs 10 and 11 at each side of the coupling sections.

The upper coupling 9 is similarly provided with longitudinal ribs such as 15 and 16 and the arcuate reinforcing ribs 17 and 18.

In the form of coupling illustrated threaded studs 19 are welded as at 20 to the longitudinal rib 10 of the lower coupling section 8. Similar studs 21 are similarly anchored as at 22 at the opposite side of the lower coupling section 8 and nuts 23 are arranged to draw the coupling halves toward each other to grip the pipe 6.

At each end of the semi-cylindrical section 8 a reduced diameter portion 24 is provided. The portion 24 presents a semi-cylindrical section generally parallel to the outer wall of the pipe 6. Spaced inwardly from each of the end portions 24 is a rib 25. The cylindrical inner diameter portion 26 on the rib 25 presents a diameter slightly greater than the diameter of the portion 24. A gasket section 50 is arranged in the righthand end of the coupling section 8 in the groove formed between the rib 25 and the portion 24. Similarly a gasket section 51 is arranged in the groove formed at the lefthand end of the section 8 as viewed in FIG. 3. A girdering section 30 is welded as at 31 along the surface 24. The girdering section 30 is made of sheet metal and is slotted as at 32 to accommodate a diameter reduction resulting from the shaping of the girdering member 30 so as to overhang the gasket 50. The girdering member 30 thus provides its least diameter in the area 30a, its greatest diameter in the area 30b and a sloping section connecting 30a and 30b as indicated at 30c. The girdering member gradually conforms to the outer surface of the pipe 6 when the nuts 23 are drawn up. Inasmuch as the girdering member 30 overhangs a portion of the gasket section 50, as shown in FIG. 3, the pipe which is to be coupled is first brought into contact with the girdering section 30a and, as the coupling sections 8 and 9 are drawn up toward each other, the bearing of the pipe against the girdering member 30 is transmitted to the gasket 50.

Three annular portions of the gasket section 50 are not directly confined by any metal members. One exposed annular portion is indicated at 50a, a cylindrical annular portion is indicated at 50b and an annular radial face under the girdering member 30 is indicated at 50c. The result of this arrangement is that when the coupling sections are drawn toward each other, the gasket section 50 may be deformed on the faces 50a, 50b and 50c which are unconfined. Since the rubber-like material of the gasket section 50 is free to flow in response to the pressure applied by the girdering member 30, it may accommodate slight variations in the surface of the pipe and will cause the gasket section 50 to seal tightly against the pipe and prevent leakage when the sections 8 and 9 are drawn toward each other.

The gasket section 51 at the lefthand end of the coupling section 8 is similarly covered with a girdering member 30 and provides for the deformation of the gasket 51 substantially the same as the gasket 50 at the righthand end of the coupling.

The edge of the coupling section 8 adjacent the rib 10 is cut away to provide a shoulder indicated at 40. The opposite edge of the section 8 adjacent the rib 11 is similarly machined to provide a shoulder 41. The shoulders 40 and 41 extend longitudinally along each side of the coupling section 8 and at each end of each shoulder 40 annd 41 they merge into and open into the grooves receiving the gasket sections 50 and 51.

Adjacent each of the shoulders 40 and 41 an elongated metal strip as at 42 and 43 is welded along the interior of the coupling member 8. The location of the strip 43 adjacent the groove 41 is illustrated in FIGS. 3, 5 and 7. The strips 42 and 43 form with the shoulders 40 and 41, respectively, rectangular grooves to receive longitudinally extending gasket sections 60 and 61. The gasket 60 is located in the groove formed adjacent the rib 10 and the gasket 61 is located in the groove formed adjacent the rib 11.

The gasket sections 50—51 and 60—61 are integrally formed in a rectangular molded gasket illustrated in FIG. 6. The section 51 is curved when assembled in the groove formed between the section 24 and the rib 25 at the lefthand end of the coupling member 8. Similarly the section 50 is formed into the semi-circular contour as shown in FIG. 7 when the gasket is assembled with section 50 in the groove formed between the section 24 and the rib 25 at the righthand end of the coupling section 8. Since the longitudinal grooves formed at each side of the coupling merge into the semi-circular grooves at each end of the coupling and, since the gasket is a unitary, one-piece structure, a fluid-tight seal is formed by the gasket wherever the gasket is adjacent the pipe or adjacent the complementary fitting section.

The longitudinal gasket sections 60 and 61 are provided with girdering elements 62 and 63 shaped as illustrated in FIG. 8. It will be observed that the girdering element 63 along with the strip 41 and the shoulders formed in section 8 leave two areas of the gasket section free to deform under pressure. When the coupling sections are drawn toward each other, as best shown in FIG. 2, the girdering elements 62 and 63 on the longitudinal gasket sections 60 and 61 bear against similar girdering elements carried by the upper coupling section 9. Accordingly the gasket sections extending longitudinally, such as sections 60 and 61, are restrained against outward extrusion in the gap between the portions 10 and 15 on the righthand side and the portions 11 and 16 on the lefthand side as viewed in FIG. 2.

According to my invention each of the coupling sections is equipped with a plurality of pipe-locking devices arranged to engage and bite into and hold the pipe to be coupled. This feature is particularly important where two pipe sections, such as 3 and 4 of FIG. 12, are to be coupled. In the diagrammatic showing of FIG. 12 the locking devices are diagrammatically illustrated as at L. It will be understood as the description proceeds that in the diagrammatic showing of FIG. 12 one coupling section is shown on the upper half of the pipe and a complementary section is shown engaging the bottom half of the pipe.

The locking devices indicated in their entirety as at L are arranged in pairs at each end of each coupling section and in FIG. 3 the pair of locking devices at the lefthand end are indicated at L1 and L2 and the locking devices at the righthand end are indicated at L3 and L4. Each of the locking devices as, for example, L4 shown in detail in FIGS. 9, 10 and 11, comprises an arcuate shoe 70 which is tack-welded as at 71 to the interior of the coupling section 8 immediately adjacent the rib 25. The arcuate shoe 70 is provided with an interior bottom wall as at 72 which is in the form of a wedge or cam face. An arcuate lock member 73 is nested within the arcuate shoe 70 and is retained loosely therein by a pin 74. The space between the walls of the arcuate shoe 70 is greater than the width of the lock member 73 so that as the member 73 slides in the direction of the arrow 75 in FIG. 11, the member 73 will be moved radially inward.

The inner face of the lock member 73 is provided with annular teeth 76 so that as the lock member 73 is moved axially and inwardly, the teeth 76 bite into the outer wall of the pipe 3. The movement of the lock member 73 is caused by engagement with the pipe 3. Under fluid pressure and in response to forces acting on the pipes 3 and 4, there is a tendency for the pipes 3 and 4 to move away from each other. This tendency is arrested by the locking devices L carried at the interior of the coupling member 8 and 9. The locking devices L may be retained within the coupling when the coupling is used as illustrated in FIG. 13.

In certain installations such, for example, as the installation of FIG. 14, the locking members are removed from the coupling. In FIG. 14 the pipe 3a and the pipe 4a are threaded into a sleeve coupling 80. Assuming that a leak develops in the coupling sleeve 80, the coupling sections 8 and 9, according to my invention, may be applied to the pipes 3a and 4a. In this installation, in order to accommodate the axial extent of the sleeve 80, the pipe locking devices L are broken away by breaking the shoes 70 away from the coupling sections at the tack-weld 71.

In all installations employing the coupling of my invention the drawing up of the nuts 23 will securely hold fluid pressure in the pipe for a long period of time. The repairs or application of the coupling for installations such as FIGS. 13 and 14 may be made while fluid is being pumped through the pipes such as the pipe 6 and the pipes 3a—4a. Thereafter the coupling members 8 and 9 may be welded to the pipe as illustrated at 8a and 9a in FIG. 1. The coupling members 8 and 9 may also be welded to each other along the horizontal gap as indicated at 2 in FIG. 2a.

Preferably the girdering members 30 are welded to the interior of the body section before the gasket member is installed. The slotted portions of the girdering member may be bent radially inward to accommodate the positioning of the gasket portions 50 and 51 and thereafter the slotted portions of the girdering members 30 may be restored to the position shown in FIG. 3. This method of assembly, namely, the welding of the girdering members to the sections prior to assembly of the gasket, insures against heat damage to the gasket occasioned by the welding. Alternatively the use of the heat resistant gaskets would permit welding the girdering members 30 in place after the gasket sections had been assembled with the coupling part.

Although I have described one form of my invention in considerable detail, it will be understood by those skilled in the art that numerous modifications may be made therein without departing from the scope of the invention as defined in the following claims.

What is claimed is:

1. A pipe coupling for spanning a pipe circumferentially, said coupling being divided along longitudinal edges into a plurality of coupling members, means for securing said coupling members together at said longitudinal edges into a single unit spanning the pipe circumferentially, said pipe coupling having a central portion intermediate its ends with a cylindrical inner wall of substantially greater diameter than the outer diameter of the pipe to define an annular chamber within the coupling around the pipe, said coupling having reduced portions at each end having a diameter substantially less than that of said annular chamber and adapted to receive the pipe therethrough, the axially inner ends of said reduced portions adjacent said chamber defining axially spaced internal circumferential shoulders, a pair of axially spaced deformable arcuate gasket elements carried by each of said coupling members at the inside thereof at the axially inward ends of the shoulders, the corresponding arcuate gasket elements on the coupling members being aligned end to end with each other and forming two spaced internal circumferential gaskets at the inside of the coupling to seal against the surface of the pipe when said coupling members are secured together, flexible girdering means for each circumferential gasket, means permanently and rigidly securing said girdering means to said coupling axially outward from the respective circumferential gasket, said girdering means extending axially only partially across the latter's radially inward face and termianting short of the latter's axially inward edge and extending radially inward beyond the outer periphery of the pipe to be coupled, each shoulder and the respective girdering means confining the respective circumferential gasket at its axially outward end and leaving the axially inward extremity of said gasket exposed at its radially and axially inward face, each of said girdering means being so constructed and arranged so as to be bendable radially outward by engagement of the outside of the pipe when said coupling members are secured together thereabout to deform the exposed extremity of the respective circumferential gasket into tight sealing engagement against the pipe and to trap said gasket against outward extrusion from fluid pressure in the pipe, each of said coupling members having a recess at the inside along each longitudinal edge between said arcuate gasket elements radially outward of said inner cylindrical wall, a deformable longitudinal gasket element seated in each recess and extending between said arcuate gasket elements, each of said longitudinal gasket elements having a radially and longitudinally extending sealing face which normally projects beyond the respective longitudinal edge of the respective coupling member, longitudinal girdering means rigidly secured to the inside of each coupling member adjacent each of said longitudinal recesses and extending only partially across the latter's radially inward side and terminating short of the sealing face of the latter, leaving the respective longitudinal gasket element exposed at the radially inward extremity of sealing face and spaced radially from the pipe within the coupling, and a retainer for each longitudinal gasket element at the latter's sealing face, each retainer having a first leg extending lengthwise of the respective longitudinal gasket element from the radially outward side thereof only partially across the latter's sealing face and terminating short of the radially inward extremity of said sealing face, each retainer having a second leg extending lengthwise of the respective longitudinal gasket element transversely from said first leg across the radially outward side of said longitudinal gasket element inside the recess which receives said longitudinal gasket element, said second leg on each retainer being substantially shorter circumferentially than the normal circumferential thickness of the respective longitudinal gasket element and terminating short of the bottom of the respective recess to permit the retainer to move circumferentially into the recess and compress the gasket element as the coupling members are brought into sealing engagement along their longitudinal edges, said second leg on each retainer member terminating at each longitudinal end in inturned extremities which extend snugly around the adjacent ends of the respective longitudinal gasket element.

2. A pipe coupling for spanning a pipe circumferentially, said coupling being divided along longitudinal edges into a plurality of coupling members, means for securing said coupling members together at said longitudinal edges into a single unit spanning the pipe circumferentially, said coupling having a central portion intermediate its ends with a cylindrical inner wall of substantially greater diameter than the outer diameter of the pipe to define an annular chamber within the coupling around the pipe, said coupling having reduced portions at each end having a diameter substantially less than that of said annular chamber and adapted to receive the pipe therethrough, the axially inner ends of said reduced portions adjacent said annular chamber defining axially spaced internal circumferential shoulders, a pair of axially spaced deformable arcuate gasket elements carried by each of said coupling members at the inside thereof axially inward of said shoulders, the corresponding arcuate gasket elements on the coupling members being aligned end to end with each other and forming two spaced internal circumferential gaskets at the inside of the coupling adapted to seal against the surface of the pipe when said coupling members are secured together, means retaining said arcuate gasket elements against displacement axially, each of said coupling members having a recess at the inside along each longitudinal edge between said arcuate gasket elements radially outward of said inner cylindrical wall, a deformable longitudinal gasket element seated in each recess and extending between said arcuate gasket elements and spaced radially from the pipe, each of said longitudinal gasket elements having a radially and longitudinally extending sealing face which normally projects beyond the respective longitudinal edge of the respective coupling member, longitudinal girdering means rigidly secured to the inside of each coupling member adjacent each of said longitudinal recesses and extending only partially across the latter's radially inward side and terminating short of the sealing face of the latter, leaving the respective longitudinal gasket element exposed at the radially inward extremity of the sealing face, and a retainer for each longitudinal gasket element at the latter's sealing face, each retainer having a first leg extending lengthwise of the respective longitudinal gasket element from the radially outward side thereof only partially across the latter's sealing face and terminating short of the radially inward extremity of said sealing face, each retainer having a second leg extending lengthwise of the respective longitudinal gasket element transversely from said first leg across the radially outward side of said longitudinal gasket element inside the recess which receives said longitudinal gasket element, said second leg on each retainer being substantially shorter circumferentially than the normal circumferential thickness of the respective longitudinal gasket element and terminating short of the bottom of the respective recess to permit the retainer to move circumferentially into the recess and compress the gasket element as the coupling members are brought into sealing engagement along their longitudinal edges, said second leg on each retainer terminating at each longitudinal end in inturned extremities which extend around the adjacent ends of the respective longitudinal gasket element.

3. A pipe coupling as set forth in claim 2 including pipe clamping means at each end of said coupling within said annular chamber, each of said pipe clamping means including a shoe secured to the inner wall of said coupling member axially inward of said circumferential gaskets within said annular chamber, said shoe having an axially extending camming surface sloping radially inwardly and axially outwardly toward the end of the coupling, a clamping wedge adapted to make gripping engagement with the surface of the pipe within the coupling, means guiding said clamping wedge for axial movement in said shoe and retaining said wedge radially and circumferentially within said shoe, said shoe having stop means to limit the axial movement of said wedge, whereby axial movement of the pipe outward from said coupling causes the wedge to be moved axially outward with the pipe and to be moved radially inward by the camming surface on said shoe to make tighter gripping engagement with the pipe.

References Cited in the file of this patent

UNITED STATES PATENTS

| | | |
|---|---|---|
| 2,047,569 | Loomis | July 14, 1936 |
| 2,177,184 | Martin et al. | Oct. 24, 1939 |
| 2,449,795 | Stillwagon | Sept. 21, 1948 |
| 2,713,352 | Schustach | July 19, 1955 |
| 2,770,477 | Rankin | Nov. 13, 1956 |
| 2,897,899 | Hall | Aug. 4, 1959 |
| 2,017,204 | Smith | Jan. 16, 1962 |

FOREIGN PATENTS

| | | |
|---|---|---|
| 482,469 | France | Dec. 30, 1916 |
| 763,665 | Great Britain | Dec. 12, 1956 |